United States Patent [19]

Ottosson et al.

[11] Patent Number: 5,660,168
[45] Date of Patent: Aug. 26, 1997

[54] ATTACHMENT ARRANGEMENT

[76] Inventors: Paul Ottosson, Åsklostervägen 39, S-432 96 Åskloster; Uno Sundgren, Spetsbergsgatan 2, S-414 66 Göteborg, both of Sweden

[21] Appl. No.: 379,652
[22] PCT Filed: Jun. 18, 1993
[86] PCT No.: PCT/SE93/00545
    § 371 Date: Feb. 6, 1995
    § 102(e) Date: Feb. 6, 1995
[87] PCT Pub. No.: WO94/04069
    PCT Pub. Date: Mar. 3, 1994

[30] Foreign Application Priority Data

Aug. 11, 1992 [SE] Sweden .................. 9202335
Oct. 20, 1992 [SE] Sweden .................. 9203066

[51] Int. Cl.⁶ .................... A61M 15/00; A61M 16/00
[52] U.S. Cl. .................... 128/200.24; 128/200.26; 128/207.18; 128/912; 128/DIG. 26; 128/207.14; 604/174
[58] Field of Search ............ 128/912, DIG. 26, 128/204.13, 200.24, 200.26, 202.27, 207.14–207.18, 716, 719, 723; 607/137; 604/174, 177, 178; 73/343 R, 374

[56] References Cited

U.S. PATENT DOCUMENTS

| | | | |
|---|---|---|---|
| 2,445,539 | 7/1948 | Singer | 128/207.15 |
| 2,797,682 | 2/1957 | Kannenberg . | |
| 3,117,450 | 1/1964 | Hoy | 73/374 |
| 3,139,088 | 6/1964 | Galleher, Jr. . | |
| 3,780,586 | 12/1973 | Donofrio | 73/374 |
| 3,913,402 | 10/1975 | Doyle | 73/343 R |
| 4,072,054 | 2/1978 | Blouin et al. | 73/343 R |
| 4,083,364 | 4/1978 | Kelly et al. | 128/207.15 |
| 4,185,639 | 1/1980 | Linder | 128/DIG. 26 |
| 4,261,354 | 4/1981 | Nelson | 128/204.13 |
| 4,262,666 | 4/1981 | Nelson | 128/204.13 |
| 4,378,012 | 3/1983 | Brown | 128/DIG. 26 |
| 4,491,426 | 1/1985 | Berndt . | |
| 4,719,911 | 1/1988 | Carrico . | |
| 5,097,827 | 3/1992 | Izumi | 128/912 |
| 5,105,807 | 4/1992 | Kahn et al. | 128/912 |
| 5,123,410 | 6/1992 | Greene et al. | 128/DIG. 26 |
| 5,172,688 | 12/1992 | Dillion | 128/DIG. 26 |
| 5,185,005 | 2/1993 | Ballantyne | 128/DIG. 26 |
| 5,400,797 | 3/1995 | Ethridge | 128/716 |

FOREIGN PATENT DOCUMENTS

2551495  5/1977  Germany .
 463494  3/1990  Sweden .

Primary Examiner—Kimberly L. Asher
Attorney, Agent, or Firm—Dvorak & Orum

[57] ABSTRACT

The present invention relates to an arrangement for the acceptance of an object such as a measuring device, sensor, probe, tube for use in the mouth, nose or other body orifice of a person or animal. A pressure applying component of the arrangement is capable of being applied externally around the orifice on the body of the individual while an attachment component receives the object of the kind in question. The pressure part is arranged to cause attachment through interaction with the object or by applying a counter-pressure device attached to the pressure component.

10 Claims, 8 Drawing Sheets

ATTACHMENT ARRANGEMENT

This application is a 371 of PCT/SE93/00545 filed Jun. 18, 1993.

BACKGROUND OF THE INVENTION

The present invention relates to an arrangement for the attachment of objects such as a measuring device, a sensor, a probe, a tube or the like in the mouth, nose or other orifice of a person, or to a breathing mask, a protective mask or similar kind of device having an orifice.

The measurement and recording of the body temperature is performed in hospitals and other health examination facilities for ethical, hygienic, nosocomial and practical reasons with the aid of a thermometer for oral or axillary temperature measurement. It may be difficult, however, for certain persons who are fully conscious to keep the thermometer in their mouth for a period of the between 10 and 30 seconds dung measurement. Measurement at a specific point inside the mouth is then not so easy to achieve.

It has been found that the measurement of temperature is particularly effective in the area of a person's molar teeth, at a distance from the mouth, which accordingly does not necessarily have to be fully closed in order to prevent interference with the measurement by colder air from outside etc.

The thermometer is an important clinical diagnostic instrument for the care and investigation of patients, both in out-patient and institutional medical care. Fever reactions in the patients are able to provide valuable information about the type and degree of any illness, and temperature measurements at frequent intervals provide the opportunity to study the course of illness, when the effect of any therapy, etc., used can be evaluated objectively. The resulting temperature curve is an indispensable diagnostic guide in post-operative monitoring, for which reason frequent measurement and recording of the patient's body temperature is a routine procedure in surgical wards and intensive care wards. Not only must the method of measurement be reliable, rapid and precise, but its measurement must also be simple to execute and be "pain-free" and comfortable for the patient.

Previously disclosed means for the attachment of thermometers, probes, tubes and similar objects have consisted of tape, wadding, bite blocks and the like, which have been found difficult to use with regard to their application, use and removal.

SUMMARY OF THE INVENTION

The principal object of the present invention is to make available an arrangement of the aforementioned kind, which solves said problems in a secure and pain-free fashion by simple and efficiently functioning means.

Said object is achieved by means of an arrangement which is characterized essentially in that the arrangement comprises a pressure part capable of being applied externally around an individual's body, an attachment part for an object of the kind in question, and a counter-pressure part capable of being introduced internally into said body orifice, which pressure part is so arranged as to achieve said attachment through interaction with said object or with a counter-pressure part connected to the pressure part.

DETAILED DESCRIPTION OF THE DRAWINGS

The present invention is described below as a number of preferred illustrative embodiments, in conjunction with which reference is made to the accompanying drawings, in which.

DETAILED DESCRIPTION OF THE PREFERRED EMBODIMENT

FIGS. 1-4 show an arrangement 1, which is capable of being attached an object 2, such as a measuring device in the form of a thermometer, a sensor, a probe, a tube or other similar object used in the area of health care, where such device is to be inserted in the mouth 3, nose 4 or other orifice of a person 5. The device generally comprises a pressure part 6 which is capable of being applied externally around the body 7 of an individual and which includes an attachment part 8, capable of separable attachment to the object 2 of the kind in question. The pressure part 6 is so arranged through interaction with said object 2 or with a counter-pressure device attached to the pressure part 6, to cause the attachment of the object 2.

Figure 3:
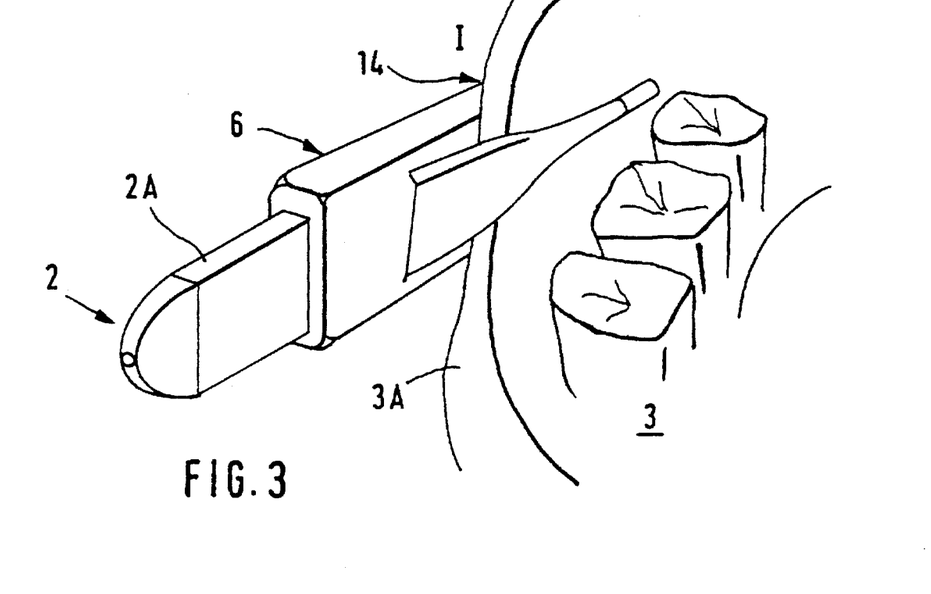
FIG. 3 shows the attachment arrangement of FIG. 2 in an attached position inside the mouth of a person.

The pressure part 6, preferably consists of flexible material such as rubber, plastic or similar material, and as mentioned, includes an attachment part 8 at the one, or rear end 6A. The attachment part 8 can be formed by a channel 9 passing through the pressure part at an angle, which channel has an opening 10 at the rear edge surface 11 of the pressure part and an opening 12 discharging onto a contact surface 13 which, in its active attachment position shown in FIG. 3, is capable of being placed in contact with the skin 14, etc., along one edge 3A of the mouth 3 in question or some other orifice of a person or animal.

With a view to further improving contact between the pressure part 6 and the skin 14 of a person, the contact surface 13 of the pressure part can exhibit friction-increasing means 15, for example corrugations or adhesive, etc.

Figure 4:
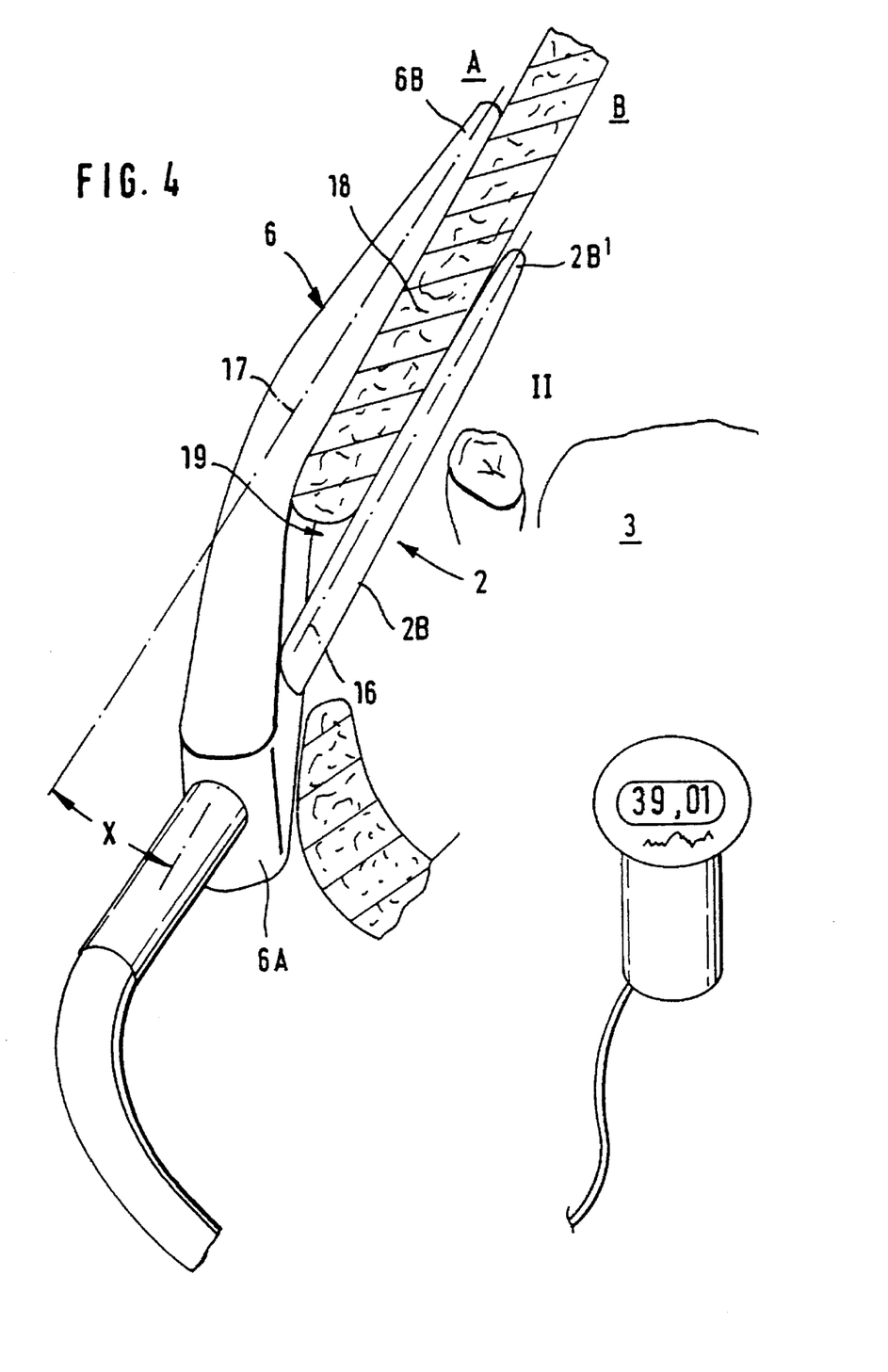
FIG. 4 shows a second embodiment of the attachment arrangement of the present invention in an attached position with a temperature measurement sensor held therein.

FIG. 4 shows channel 9 extending along a plane 16, which preferably lies essentially parallel with, or extends at a small angle X in relation to a plane 17, which runs along the front end opposite end 6B of the pressure part.

Figures 1, 2:
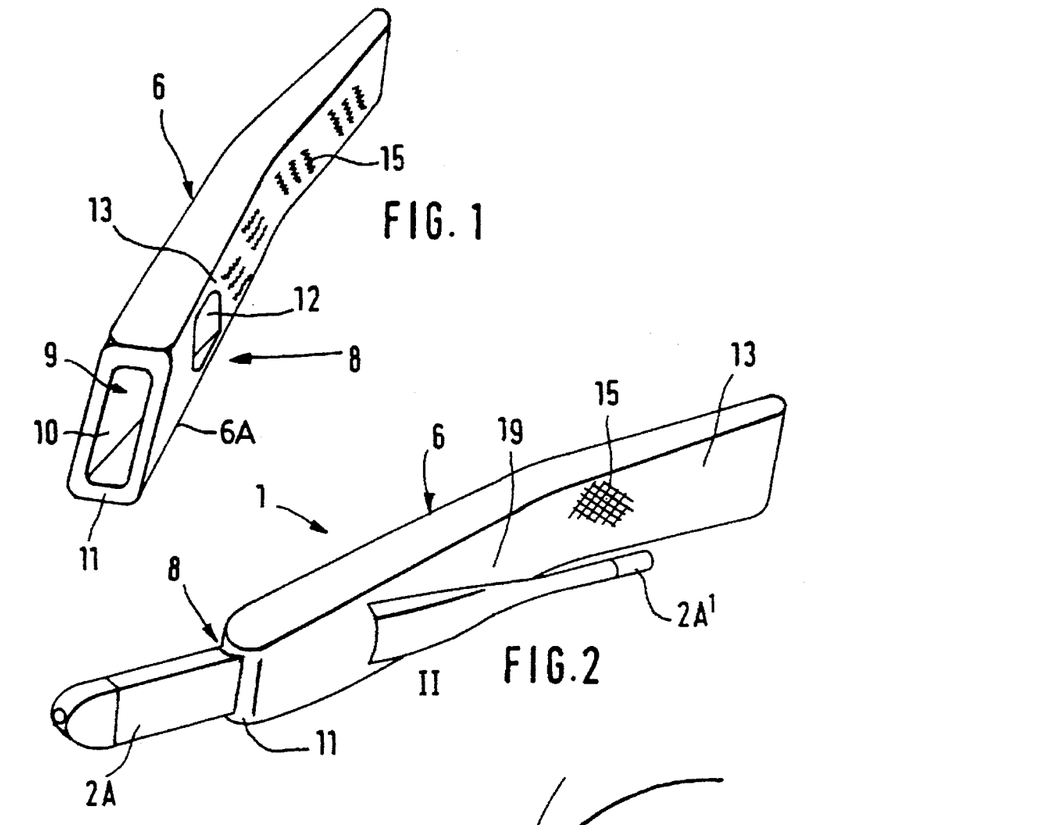
FIG. 1 shows a perspective view of an empty thermometer attachment arrangement of the present invention.
FIG. 2 shows the attachment arrangement with a thermometer in place and in a position ready for attachment to the body.

A thermometer 2A (FIG.2), a sensor 2B (FIG.4) or some other object 2 which is to be attached in position on a patient can inserted initially with its respective measuring tip 2A', 2B' through opening 10 in channel 9, and then finally into a position ready for attachment, as illustrated in FIGS. 2 and 4. Said pressure part 6 and thermometer 2A, or sensor 2B can be externally applied to either cheek side A or B, and internally within the mouth 3 against the inside of the chosen cheek, so that the cheek 18 or other skin of the patient is accommodated within the space 19 between said pressure part 6 and object 2, etc., with some clamping effect between them.

Figure 6:
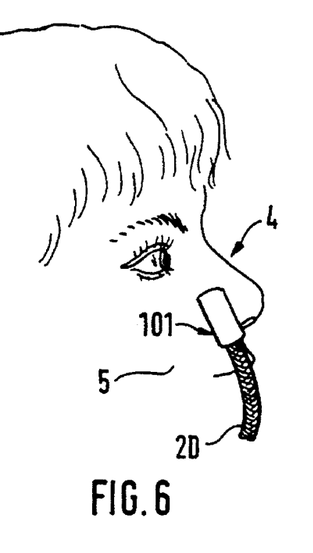
FIG. 6 shows an example of an attachment arrangement for a tube in a nose, view from the outside from the side.

Illustrated in FIG. 6 is a tube 2D, which can be securely attached to the nose 4 of a patient 5 with the help of a similar attachment arrangement 101 in accordance with the invention, although preferably of a smaller size than the mouth arrangement 1.

Figures 7, 8:
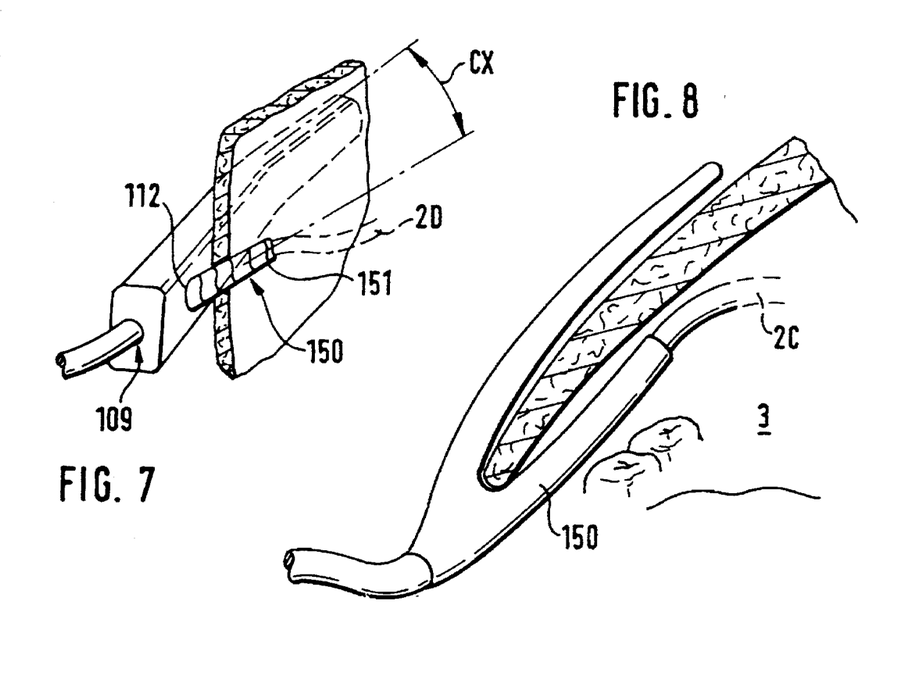
FIG. 7 shows the tube attachment device in the attached position as a perspective view from the front.
FIG. 8 shows a further example of an attachment arrangement.

FIGS. 7 and 8 illustrate an embodiment of an attachment means used with a tube 2D, probe 2C, etc., that causes a counter-pressure part 150, preferably separate from the intended object 2 and connected to the pressure part 106, to extend from one side 113 of a pressure part 106. The counter-pressure part 150, projects at an acute angle CX (See FIG. 7) from the pressure part 106 at opening 112 of channel 109 may exhibit a part 15 1 preferably capable of interacting with the peripheral surface of the tube which section the object is in contact from inside the pressure part 106.

Figure 5:
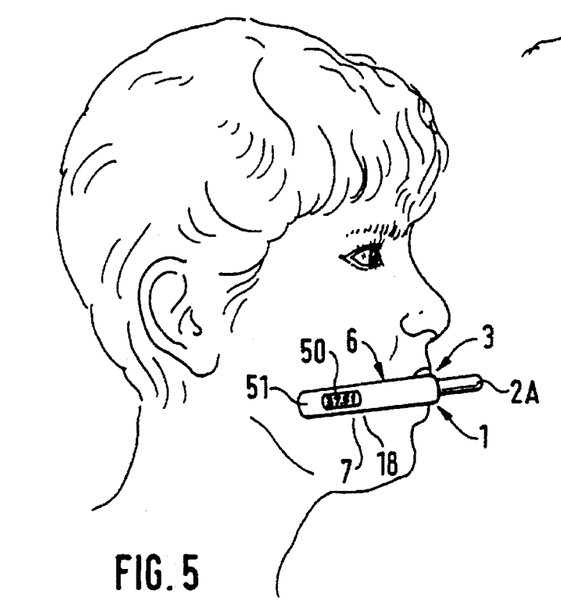
FIG. 5 shows a side view of an arrangement in an attached position inside the mouth of a patient.

In the case of an object 2 consisting of an instrument for measuring temperature or some other measuring instrument, it is possible for a measurement result display 50 to be arranged on the pressure part 6 itself (See FIG.5). A display of this kind is preferably arranged on the side 51 of the pressure part which faces away from the individual 5 so that the nursing care staff can easily read the measurement result without the need to remove the measurement object 2 from the mouth 3, etc., of the patient.

FIGS. 9–13 illustrate a further example of an attachment arrangement 201 intended for use with a measurement thermometer or some other measuring instrument within the mouth 203 of a person. If the intended measuring instrument is to be a body temperature measuring instrument it is preferably constructed as a separable device having an outer part 206, that functions as a pressure-applying component 206 externally applied around the mouth 203 and acting against the cheek 218. An inner part 202, which comprises the temperature measurement component 202A, accommodates a temperature sensor 250 at its inner measuring tip 202A'. When inserted into the mouth 203, inner part 202 makes contact with the inside of said cheek due to the biasing effect of the external pressure part 206. In this way, each of the two parts 206 and 202 will be externally and internally biased against the cheek with the skin of the cheek 218 being accommodated in the accommodating space 219. A desired damping bias is achieved between the parts 206, 202, due to the sizing of a connecting piece 251 extending therebetween, said piece 251 achieving the desired clamping force without causing discomfort through an excessively high contact pressure between the parts 202, 206.

Figure 9:
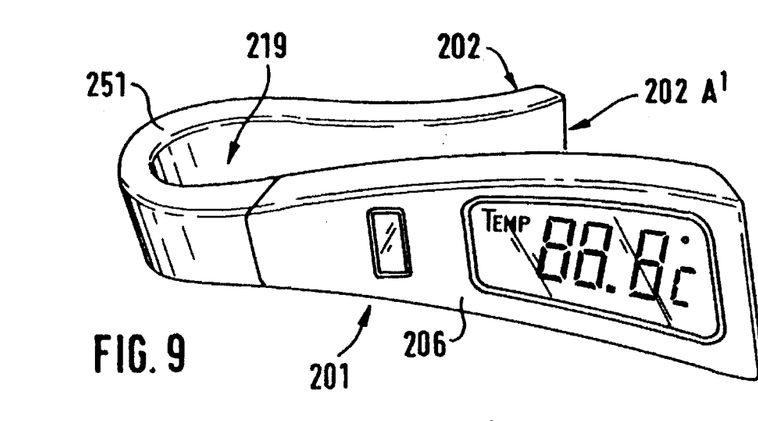
FIG. 9 shows a further example of a thermometer and its attachment arrangement.
Figure 10:
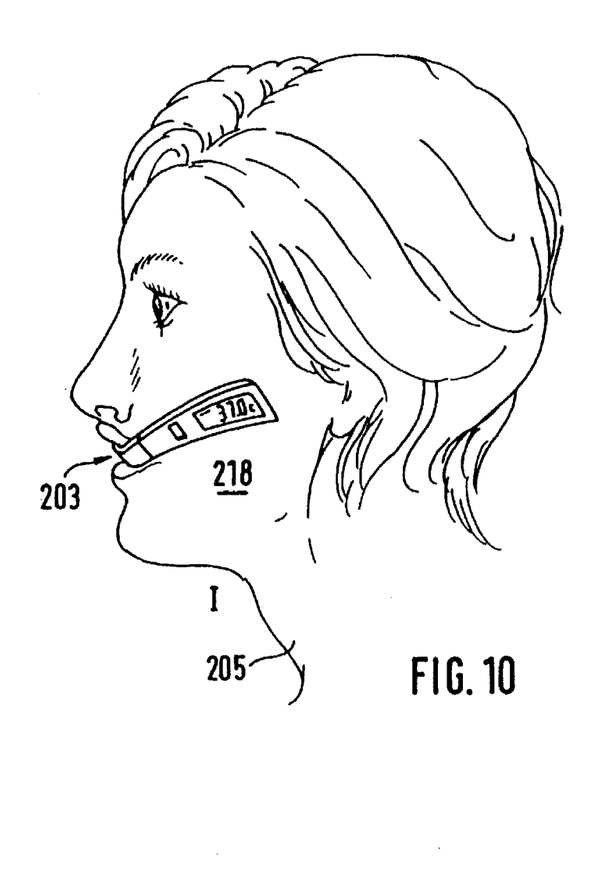
FIG. 10 shows said further thermometer in a position in use on a person.
Figure 11:
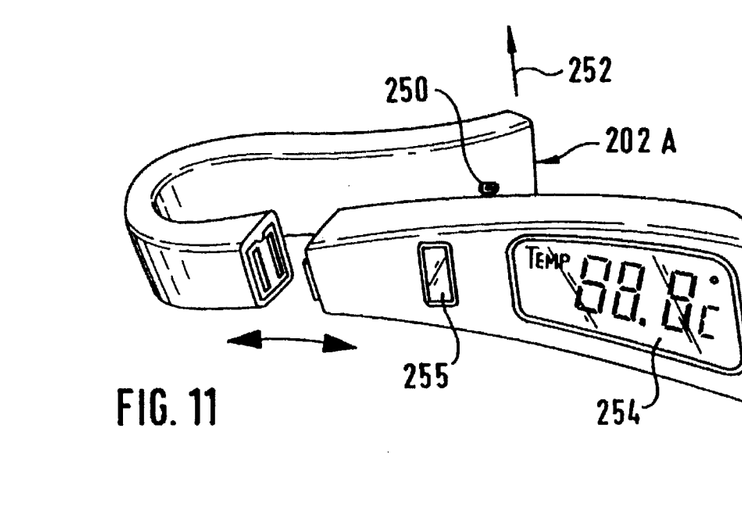
FIG. 11 shows the thermometer in a separated position.
Figures 12, 13:
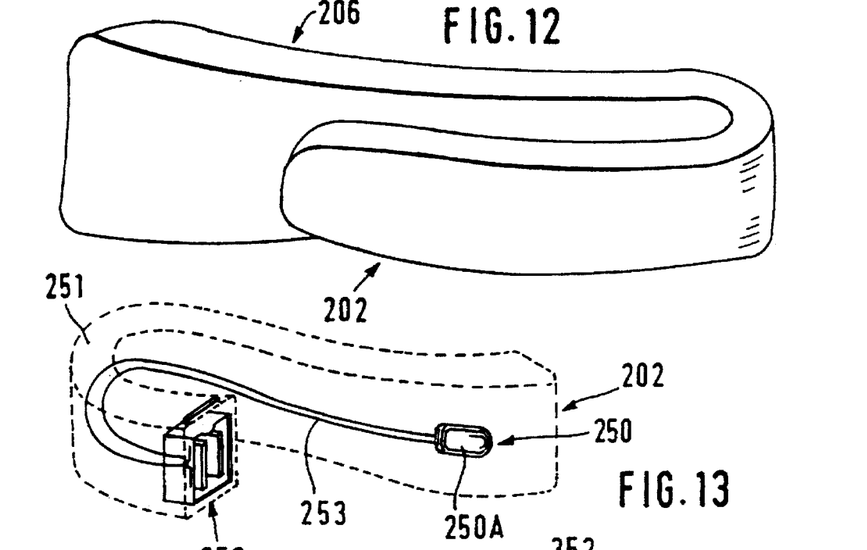
FIG. 12 shows the thermometer from its inside.
FIG. 13 shows a part of the thermometer attachment arrangement intended to be introduced into the mouth.

The inner part 202 is shaped such that no discomfort is felt by the patient when the arrangement is in use, and it is advisable to form the parts using soft, curved shapes, for example as shown in the drawings in FIGS. 9-11, including the connecting piece 251 so as to enable it to pass between the lips at the corner of the mouth of a person 205 who intends to use the invention. The innermost measurement part 202A' is for this purpose preferably curved in a direction 252 away from the intended external pressure part 206 so as to avoid causing damage to the sensitive mucous membranes of the mouth through abrasion when taking measurements, as well as when introducing the arrangement 201 into and removing it from the mouth 203.

The actual temperature measurement component 202A can be made of plastic or of some other suitable material with a thermistor 250A (resistance) embedded immediately beneath the surface of the inner part 202, in order to permit the rapid absorption of the prevailing temperature of the mucous membrane pressing against it at the time of measurement. The thermistor 250A is preferably positioned at the vertical center of the inner part 202 in order to prevent air from circulating around the thermistor during the actual temperature sensing, thereby interfering with the measurement result.

Said inner part 202 may be produced in such a way as to be readily detachable from the external part 206. An electrical connector 252 between the parts 202, 206 can be provided which permits the separation of the parts 202, 206 from one another after measurements are performed In this way each person being measured could have his/her own personal inner part 202, assembled to a shared outer part 206 of the arrangement.

Said electrical connector 252 can comprise a combined contact and retaining part for the purpose of transferring temperature information via wires 253 from the thermistor 250A to a display panel 254 situated on the pressure part 206. The connector transfers current internally at the point of connection between the parts without being subjected to interference by external conditions, and reliably functions without the risk of disconnection of the parts 202, 206 from one another.

A battery or solar cell for powering the thermometer can be provided internally inside of said part 206, and a preferably waterproofed actuating control, such as a button 255 sealed by a rubber gasket, can also be provided on the part 206, for switching on and off the measurement and display function of the thermometer.

Moving the parts 202, 206 along the direction of the arrows in FIG. 11 connects or disconnects the parts from one another.

It must also be pointed out that said inner and outer parts 202, 206 can be integrated with one another if this is desired.

Figure 14:
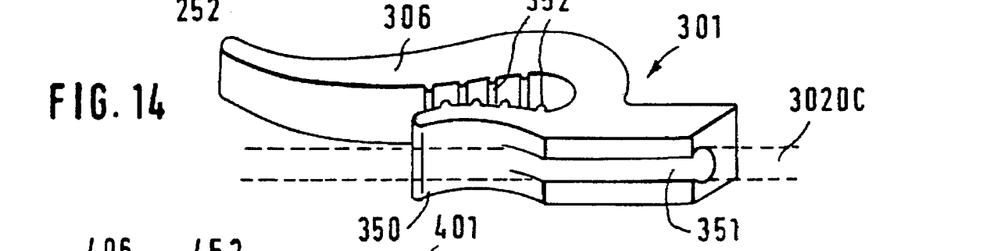
FIG. 14 shows an embodiment for the longitudinal accommodation of an object.

The arrangement 301 shown in FIG. 14 is used for the secure attachment of a tube or a probe 302DC, for example to the nose of a person. It consists of a unit comprising a pressure part 306 acting externally and a counter-pressure part 350 acting internally of a body cavity. An attachment object 302DC of the intended kind is intended to be capable of readily separable attachment to said internal counter-pressure part 350, for example from a matching laterally open channel 351, for example as illustrated in FIG. 14. In the case of the counter-pressure part 350 being capable of being introduced into a nostril, and the pressure part 306 being capable of being applied externally against the nostril, the arrangement 301 is clamped effectively onto a probe or tube 302DC that extends along accommodating channel 351 of counterpressure part 350. Grooves 352, or other means of increasing friction, may be provided on the parts 350, 306 in order to increase the gripping interaction with the nostril.

Figure 15:
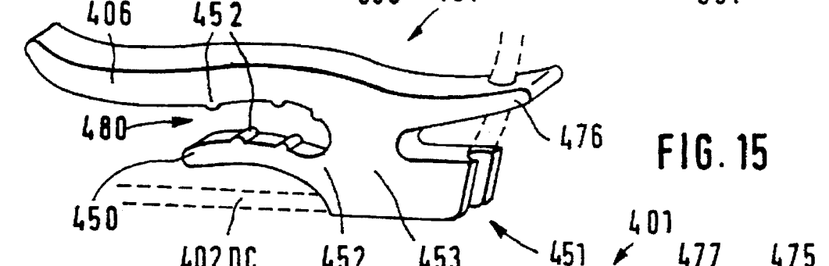
FIG. 15 shows a further embodiment of an attachment arrangement for the accommodation of objects lying in a transverse direction, which it is wished to attach.
Figure 16:
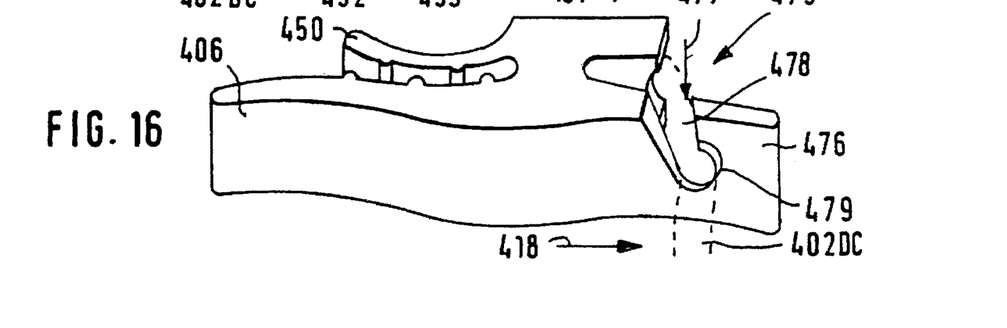
FIG. 16 is a perspective view of the FIG. 15 embodiment when laid on one of its sides.
Figure 17A:
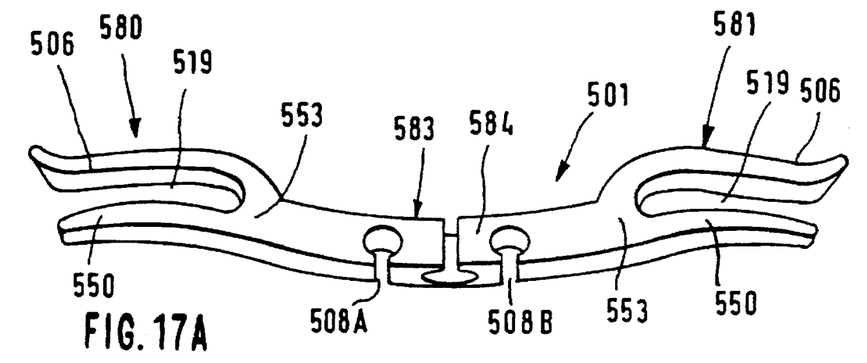
FIG. 17A shows a perspective view of another embodiment of an attachment arrangement for accommodating both a mouth/stomach probe and a nasal probe.
Figure 17B:
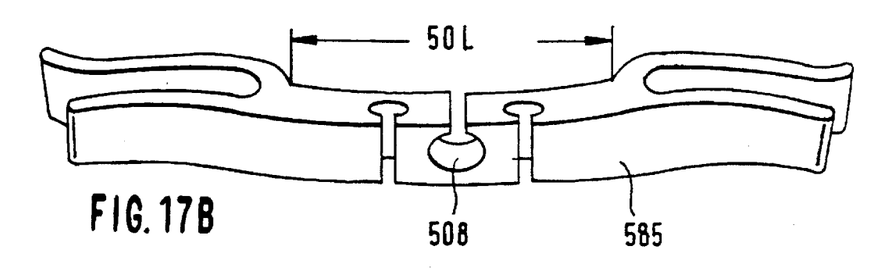
FIG. 17B is a perspective view of the embodiment of FIG. 17A, emphasizing more of its front.
Figure 17C:
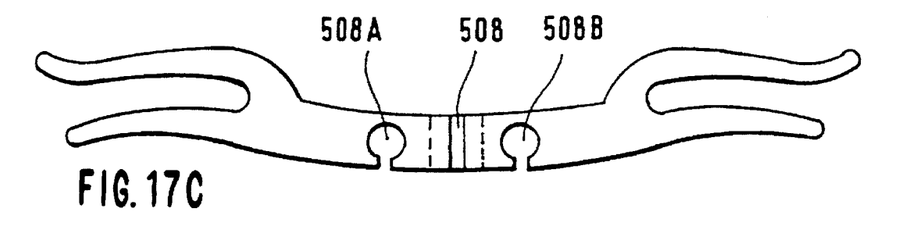
FIG. 17C is an end view of the embodiment of FIG. 17A.
Figure 17D:
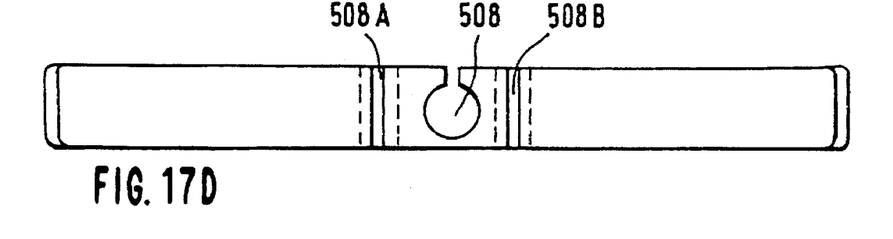
FIG. 17D is a bottom view of the embodiment of FIG. 17A.

Illustrated in FIGS. 15 and 16 is another example of an attachment arrangement 401 for a tube or probe, 402DC, in which an external pressure part 406 and an internal counter-pressure part 450 are attached to one another via a connecting part 453, which, although it resembles the probe/tube attachment arrangement 301 of FIG. 14, has a lateral guide device 475 for the tube or probe 402DC. For example, said lateral guide device may consist of a slot-shaped opening arranged in a tongue-shaped elongated part 476 on the pressure part 406. This permits the introduction of object 402DC from the side of the attachment arrangement 401 which can further be secured by means of a longitudinal slot 451 provided in the rear part 452 of the counter-pressure part 450. Tube on probe 420DC introduced laterally in the direction of the arrow 477 into the lateral slot 478 in the elongated part 476 so as to be retained in an internal cavity 479. A nose clamp of this kind, would be arranged to grip the nostril of a person with said pressure parts 406, 450 situated respectively on the outside and inside of one nostril of a nose that would be accommodated in space 480 between the parts 406, 450. In this case, the grooves 452 serve to increase the gripping interaction with the nose and to prevent arrangement 401 from being pulled out from the nose along the direction of withdrawal represented by arrow 418.

In the event it is desirable to introduce more than one object into the intended orifice, for example not only a thermometer and/or a probe, but also tubes to be introduced into and accommodated in the mouth or the nose of a patient, the present device is not restricted to being used with only one object at a time, rather two or more objects can naturally be attached at the same time to the same arrangement, including with the arrangement shown in FIG. 3.

FIG. 17 shows another embodiment of an attachment arrangement 501 that can be used for both a mouth probe and a nasal probe,. An arrangement 501 of this kind comprises at least one set of matched pairs of attachment parts 580, 581 facing away from one another, each of which, is also provided with an outer pressure part 506 and an inner counter-pressure part 550, as well as a respective connecting part 553. A connecting bar 583 extending between said attachment parts 580, 581 is situated at a medial distance from each of said parts 580, 581 thereby connecting them to one another. This makes it possible to grip the edge part of an orifice with said pairs of pressure parts 506 and counter-pressure parts 550 in such a way that it is accommodated in said accommodating space 519. The corners of a person's mouth, for example, can be accommodated therein. In order to fit between the edges of a mouth or other orifice, the length 50L of said bar 583 can be adapted so as to fit the desired width of the orifice, i.e. several attachment arrangements 501 each with differing length 50L can be provided for selection of the best-fitting arrangements.

In connecting bar 503 preferably centrally on said bar 583, an opening 508 extends from one side surface 585 of the attachment bar 583, towards the other side 583 into which, a mouth probe can be introduced for example, from said side 584 of the bar 583 such that it projects into the mouth at a right angle therewith. The width of said opening 508 may be as much as approximately 10 min.

A number of additional openings 508A, 508B can be provided near the center of the bar, which extend normal to the direction of said opening 508, from the one side 584 of the bar through, to the other side. The additional openings can be adapted for small tubes and probes and for 5 that reason exhibits a smaller diameter than the opening 508.

The function of this arrangement 501 should be obvious from its execution.

Figure 18:
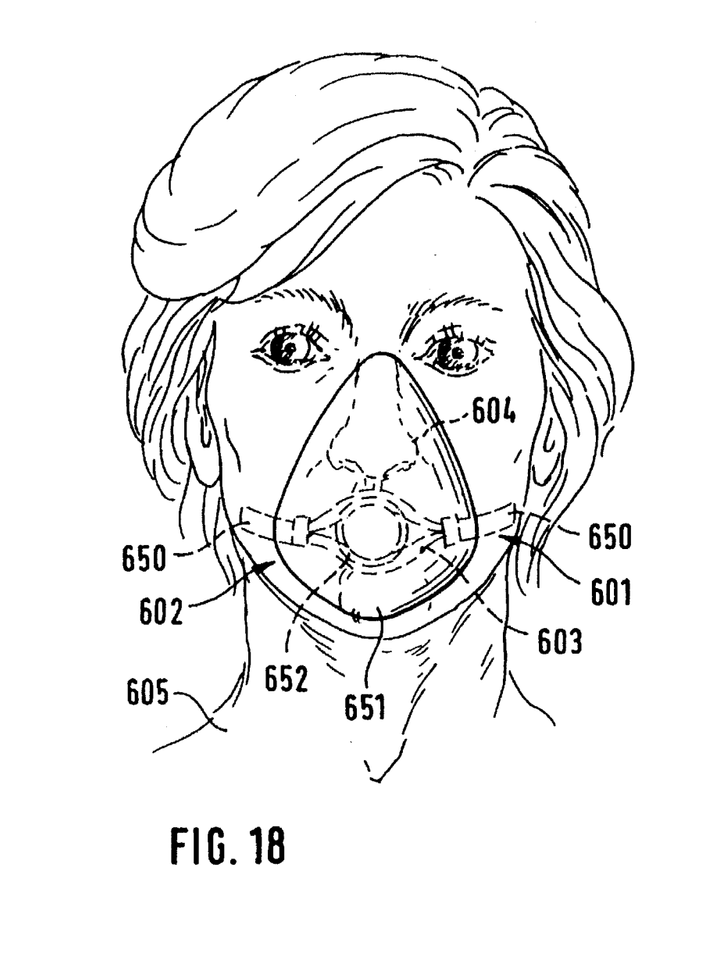
FIG. 18 shows a front view of a breathing mask in a position attached to a person.

The breathing mask 602 illustrated in FIG. 18 exhibits an attachment arrangement 601 for securing the mask 602 close to the mouth 603 and nose 604 of a person 605. Thus avoiding the need to use an elastic string around the neck of the person 605, which can be difficult for example, where damage to the neck is present. The attachment arrangement 601 can be formed preferably from pairs of spring-assisted tongues 650 which are intended to act against the inside of the wearer's cheeks in the mouth, preferably in the vicinity of the corners of the mouth. The mask 602 is thus in essentially close contact with the wearer's face with its peripheral edge 651 serving as an external pressure part, while the attachment arrangement 601 is clamped against the inside of the mouth, thereby effectively retaining the mask 602 in position without the need to hold the mask 602 with the hands. A connection 652 on the mask 602 permits the passage of air or other respiratory gas, for example the administration of oxygen, etc., or even mouth-to-mouth resuscitation.

Figure 19:
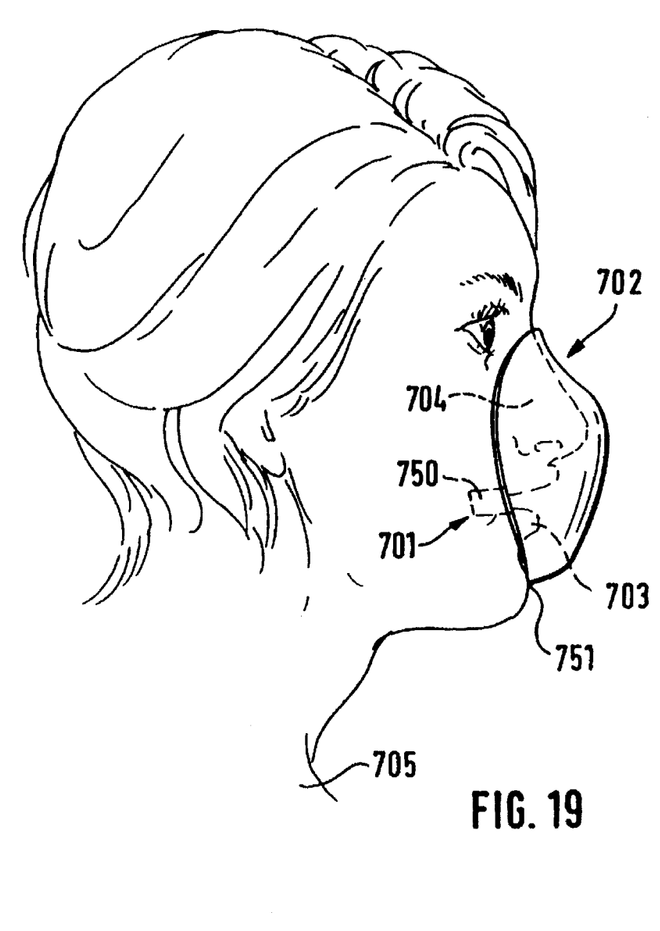
FIG. 19 shows a side view of the protective mask of FIG. 18 in relation to the mouth and nose of a person.

FIG. 19 shows a protective mask 702 of the type which is used by tradesmen to protect against breathing in impurities and similar undesired particles. This mask 702 is also provided with an attachment arrangement 701 in the form of the preferable spring-assisted torques 750, which make contact from inside the mouth with the wearer's cheeks. The protective mask 702 is thus able to function without causing discomfort to the wearer 705, who is even able to speak without being obstructed by the mask 702, in spite of the arrangement 701 being pressed from the outside in the area of the peripheral edge 751 against the face of the wearer and around the mouth 703 and the nose 704.

Figure 20:
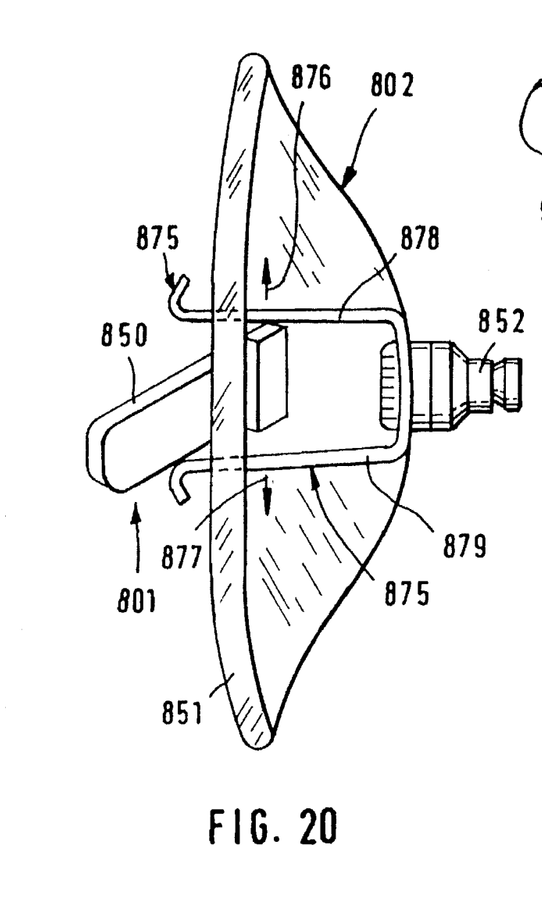
FIG. 20 shows a side view of a breathing mask with an integral mouth-opening arrangement.

FIG. 20 shows a side view of a mask 802. An attachment arrangement 801 is in the form of pairs of tongues 850 which are capable of being introduced into the mouth and exerting a counter-pressure against a centrally situated connection sleeve 852 the mouth-opening means 875 is also present on the mask 802 in order to permit the mouths of anaesthetized persons, for example, to be kept open so that they do not bite through the attached tubes and probes, etc., or so that life-saving procedures can be performed readily on persons without the need to hold their mouth open. Two stays 878, 879 each have a respective spring bias in a direction shown by arrows 876, 877, said bias moving said stays away from one another to cause the mouth of the wearer to be held open when the mask 802 is pressed in the area of its peripheral edge 85 1 and against the face of the wearer.

Figure 21:
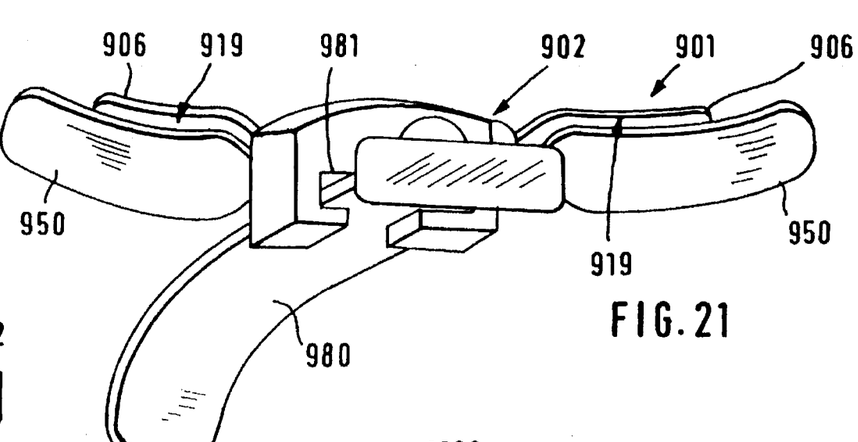
FIG. 21 shows a frontal view of a probe holder with an integral tongue holder.
Figure 22:
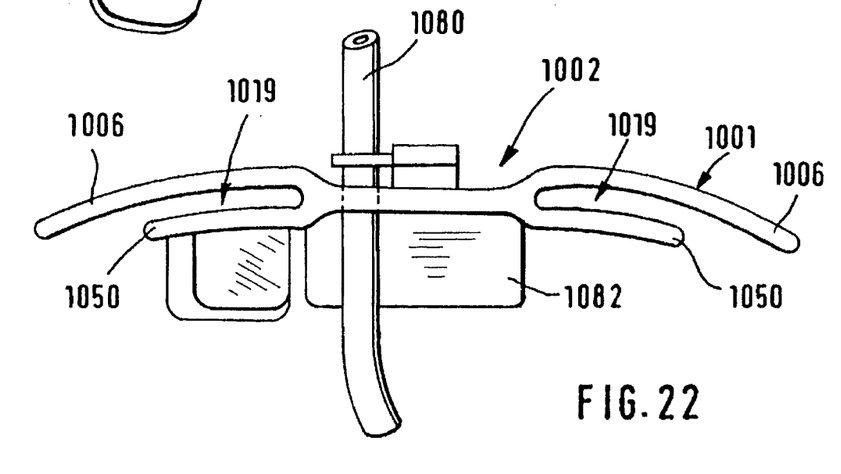
FIG. 22 shows a side view of a probe holder with an integral bite block.

Finally, the principle of securing a probe holder 902 and 1002 by means of an attachment arrangement 901 and 1001 of the kind similar to that shown in the illustrative embodiment of FIG. 17 is illustrated in FIGS. 21 and 22. A tongue holder 980, which is formed from a curved bar, and which is adjustably displaceable, in tunnel-like opening 981 of holder 902, permits the tongue to be kept out of the way when the probe holder 902 is in use, while a bite block 1082 in the embodiment of the probe holder 1002 prevents the biting-through of any probes 1080 or tubes, etc., which have been introduced into the mouth of the patient essentially when they are unconscious, for instance anaesthetized.

Present at the sides of said probe holder 902 and 1002 are pairs of respective outer pressure parts 906 and 1006 and pairs of respective inner pressure parts 905 and 1050, such that the corners of the mouth and the cheeks of a person can be accommodated in a respective interjacent accommodating space 919 and 1019 in accordance with the principles described previously.

The invention is also suitable for use with remote transmission of measurement results, e.g. by radio means.

The invention is not to be solely restricted to the illustrative embodiments described above and illustrated in the drawings, but may be modified without departing from the scope of the invention.

We claim:

1. An attachment arrangement for holding a clinical object such as a thermometer, a sensor, a probe and a tube after said object is inserted into an orifice on the body of a user, said arrangement having a front end and a rear end, and the orifice defined by a rim of body tissue, comprising:

a pressure part at one of said front and rear ends and arranged for external attachment to the body in close proximity to the body orifice;

an attachment part adapted to be positioned external to the body at the other of said front and rear ends, said attachment part having a channel extending therethrough for receiving and holding a clinical object within said attachment arrangement;

a clinical object inserted into said channel and interacting with said attachment part for creating a continuous bias between said pressure part and said clinical object, said continuous bias for tightly holding body tissue between said clinical object and said pressure part, said clinical object partially projecting within the body orifice.

2. The attachment arrangement of claim 1, wherein said channel extends substantially parallel with said other end of said arrangement.

3. The attachment arrangement of claim 2 further including a counter-pressure part inserted within said passage and disposed therein such that said clinical object is wedged between said attachment part and counter-pressure part.

4. The attachment arrangement of claim 3, wherein said counter-pressure part projects at an acute angle from said pressure part.

5. The attachment arrangement of claim 4, wherein said counter-pressure part interactively connects with said clinical object within said channel.

6. The attachment arrangement of claim 2, wherein a measurement result of said clinical object is displayed on said pressure part.

7. The attachment arrangement of claim 6, wherein said clinical object is a body temperature measuring instrument.

8. The attachment arrangement of claim 7, further including a battery to provide power to said instrument, a control switch to turn said battery power on and off, and a display element.

9. The attachment arrangement of claim 1, wherein at least said pressure part of said attachment arrangement is constructed of a flexible material.

10. The attachment arrangement of claim 9, wherein said material is formed from one of a plastic or elastomeric material.

* * * * *